(12) United States Patent
Dawes (10) Patent No.: US 10,537,820 B2
(45) Date of Patent: Jan. 21, 2020

(54) TOY CONSTRUCTION SYSTEM AND A METHOD FOR A SPATIAL STRUCTURE TO BE DETECTED BY AN ELECTRONIC DEVICE COMPRISING A TOUCH SCREEN

(71) Applicant: LEGO A/S, Billund (DK)

(72) Inventor: Laurence James Dawes, Aarhus C (DK)

(73) Assignee: LEGO A/S (DK)

( * ) Notice: Subject to any disclaimer, the term of this patent is extended or adjusted under 35 U.S.C. 154(b) by 0 days.

(21) Appl. No.: 15/518,330

(22) PCT Filed: Oct. 19, 2015

(86) PCT No.: PCT/EP2015/074172
§ 371 (c)(1),
(2) Date: Apr. 11, 2017

(87) PCT Pub. No.: WO2016/062671
PCT Pub. Date: Apr. 28, 2016

(65) Prior Publication Data
US 2017/0296938 A1   Oct. 19, 2017

(30) Foreign Application Priority Data

Oct. 21, 2014   (DK) .................................. 2014 70647

(51) Int. Cl.
*A63H 33/04*   (2006.01)
*G06F 3/044*   (2006.01)
(Continued)

(52) U.S. Cl.
CPC ......... *A63H 33/042* (2013.01); *A63H 33/088* (2013.01); *A63H 33/26* (2013.01); *G06F 3/044* (2013.01); *G06F 2203/04104* (2013.01)

(58) Field of Classification Search
CPC .. A63H 33/042; A63H 33/086; A63H 33/088; A63H 33/26; A63F 2009/241; G06F 3/044; G06F 2203/04104
(Continued)

(56) References Cited

U.S. PATENT DOCUMENTS 5,488,204 A * 1/1996 Mead ..................... G06F 3/041
                                                                178/18.06
5,848,503 A * 12/1998 Toft ..................... A63H 33/042
                                                                  52/173.1
(Continued)

FOREIGN PATENT DOCUMENTS

CN      101076386 A      11/2007
CN      101896239 A      11/2010
(Continued)

OTHER PUBLICATIONS

International Search Report issued in co-pending international application No. PCT/EP2015/074172, dated Jan. 27, 2016.
(Continued)

*Primary Examiner* — Joseph B Baldori
(74) *Attorney, Agent, or Firm* — Day Pitney LLP (57) ABSTRACT

A toy construction system comprising toy construction elements comprising coupling members (20) for detachably interconnecting the toy construction elements to create spatial structures (40), the toy construction system comprises at least a first type of toy construction elements (10), the first type of toy construction elements can be coupled to each other, wherein that the first type of toy construction elements is configured to be detected by a touch screen (60), and when toy construction elements are coupled to each other so as to form a spatial structure, the toy construction elements of the first type define a touch point pattern recognizable by the touch screen.

12 Claims, 4 Drawing Sheets

(51) Int. Cl.
*A63H 33/08* (2006.01)
*A63H 33/26* (2006.01)

(58) Field of Classification Search
USPC .......................................... 446/91, 117, 118
See application file for complete search history.

(56) References Cited

U.S. PATENT DOCUMENTS

| | | | |
|---|---|---|---|
| 6,443,796 B1* | 9/2002 | Shackelford | A63H 33/042 |
| | | | 273/237 |
| 7,397,464 B1 | 7/2008 | Robbins et al. | |
| 7,708,615 B2* | 5/2010 | Munch | A63H 33/042 |
| | | | 446/484 |
| 7,993,201 B2 | 8/2011 | Matsumoto et al. | |
| 8,062,131 B2 | 11/2011 | Hoga et al. | |
| 8,221,182 B2* | 7/2012 | Seymour | A63H 33/04 |
| | | | 446/120 |
| 8,241,912 B2 | 8/2012 | Loose | |
| 8,358,286 B2 | 1/2013 | Cannon | |
| 8,529,311 B2* | 9/2013 | Tremblay | A63H 33/046 |
| | | | 446/91 |
| 9,737,242 B2* | 8/2017 | Alberts | A61B 5/1124 |
| 9,914,065 B2* | 3/2018 | Almog | A63H 33/042 |
| 2002/0196250 A1* | 12/2002 | Anderson | G06T 19/00 |
| | | | 345/420 |
| 2004/0063078 A1* | 4/2004 | Marcus | G09B 5/00 |
| | | | 434/156 |
| 2010/0045627 A1 | 2/2010 | Kennedy | |
| 2011/0151743 A1* | 6/2011 | Munch | A63H 33/042 |
| | | | 446/91 |
| 2011/0227871 A1 | 9/2011 | Cannon | |
| 2012/0050198 A1 | 3/2012 | Cannon | |
| 2012/0062490 A1 | 3/2012 | Heatherly et al. | |
| 2012/0194457 A1* | 8/2012 | Cannon | G06F 3/011 |
| | | | 345/173 |
| 2012/0212427 A1* | 8/2012 | Li | G06F 3/0488 |
| | | | 345/173 |
| 2012/0249430 A1 | 10/2012 | Oster | |
| 2013/0012313 A1 | 1/2013 | Chen | |
| 2013/0065482 A1* | 3/2013 | Trickett | A63H 11/00 |
| | | | 446/397 |
| 2013/0217295 A1 | 8/2013 | Karunaratne | |
| 2013/0288560 A1* | 10/2013 | Abou-Hamda | A63H 33/005 |
| | | | 446/175 |
| 2013/0303047 A1* | 11/2013 | Albert | A63H 33/00 |
| | | | 446/175 |
| 2013/0310956 A1* | 11/2013 | Rehkemper | G05D 1/0234 |
| | | | 700/83 |
| 2016/0210484 A1* | 7/2016 | Shi | G06K 7/10366 |
| 2016/0310862 A1* | 10/2016 | Shi | A63H 33/042 |
| 2017/0061824 A1* | 3/2017 | Kernan | G09B 19/06 |
| 2017/0160832 A1* | 6/2017 | Fogtmann | G06F 3/044 |

FOREIGN PATENT DOCUMENTS

| | | |
|---|---|---|
| JP | 2006-277051 A | 10/2006 |
| JP | 2009-542259 A | 12/2009 |
| KR | 10-2012-0107292 A | 10/2012 |
| KR | 2014 0086805 A | 7/2014 |
| NO | 2008/060641 A2 | 2/2007 |
| WO | 2008/060641 A2 | 5/2008 |
| WO | 2012052732 A1 | 4/2012 |
| WO | 2012135747 A1 | 10/2012 |

OTHER PUBLICATIONS

Written Opinion issued in co-pending international application No. PCT/EP2015/074172, dated Jan. 27, 2016.
International Preliminary Report On Patentability with transmittal page and amended sheets of claims, issued in co-pending international application No. PCT/EP2015/074172, dated Oct. 14, 2016.
First Office Action with Search Report issued in corresponding Chinese patent application No. 201580061845.4, dated Dec. 27, 2018.
English translation of First Office Action with Search Report issued in corresponding Chinese patent application No. 201580061845.4, dated Dec. 27, 2018.
Notice of Reasons for Refusal issued in Japanese application No. JP 2017-522034, dated May 14, 2019. (Original and computer generated English Translation).

* cited by examiner

TOY CONSTRUCTION SYSTEM AND A METHOD FOR A SPATIAL STRUCTURE TO BE DETECTED BY AN ELECTRONIC DEVICE COMPRISING A TOUCH SCREEN

CROSS-REFERENCE TO RELATED APPLICATIONS

This application is a U.S. National Stage of International Application No. PCT/EP2015/074172, filed on 19 Oct. 2015 and published on 28 Apr. 2016, as WO 2016/062671 A1, which claims the benefit of priority to Danish Patent Application No. PA 2014 70647, filed on 21 Oct. 2014.

The present invention relates to a toy construction system comprising toy construction elements. Each toy construction element comprises coupling members for detachably interconnecting the toy construction elements to create spatial structures. The toy construction system comprises at least a first type of toy construction elements, the first type of toy construction elements can be coupled to one or more of the other toy construction elements.

BACKGROUND OF THE INVENTION

Various electronic devices that include a touch screen configured to detect an object, such as a stylus or a user's finger, are known and there are a relatively large number of publications that describe objects having one or more touch points that may be used as interface to a computing device having a touch screen and, in particular, in connection with toys or game play.

The patent application US 2013/0012313 A1 discloses a game piece apparatus having a plurality of conductive points for interacting with a touch screen computing device. The game piece may comprise an input component that can receive signals from the touch screen device and generate an effect based on the signals. The game piece may include momentary touch points allowing for variable game play, and also have different touch point patterns allowing the touch screen computing device to generate effects or responses based on the touch point pattern of the game piece.

The U.S. Pat. No. 8,358,286 discloses an electronic device and input and output of data from the electronic device. The patent also discloses an object that is identifiable by the electronic device having a touch screen. The object includes contact members that can engage or be positioned proximate to the touch screen. The contact members create contact points that are sensed or detected by the touch screen. The object is at least partly conductive and includes at least a first contact member and a second contact member spaced from the first contact member. The first and second contact members define the pattern of contact points. An output is generated and displayed by the touch screen when the object engages or is proximate to the touch screen and is identified.

In many cases, it is desirable to increase the possible variations of combinations.

BRIEF DESCRIPTION OF THE INVENTION

It is an object of the present invention to provide a toy construction system and a method that increases the possible variation opportunities of play.

This is achieved when the first type of toy construction elements are configured to each be detected by a touch screen and, when coupled to one or more other toy construction elements so as to form a spatial structure, to define a touch point pattern recognizable by the touch screen.

This results in increased variability of interaction between a natural three-dimensional structure and the virtual world. For example, a user may construct a large variety of spatial structures each defining a different pattern of touch points, thus allowing a user to construct a variety of spatial structures that may each be recognized by a processing device having a touch screen.

In an embodiment, the toy construction system comprises at least a second type of toy construction elements, wherein the first type of toy construction elements is configured to be coupled to at least the second type of toy construction elements, and wherein the second type of toy construction elements are each configured not to be detected by the touch screen.

Each toy construction element comprises coupling members for detachably interconnecting the toy construction elements to create spatial structures. Hence, toy construction elements that have been interconnected with each other by means of the coupling members can again be disconnected from each other such that they can be interconnected again with each other or with other toy construction elements, e.g. so as to form a different spatial structure. In an embodiment, the toy construction elements are provided with a first and a second type of coupling members, such as coupling studs and stud-receiving recesses or other pairs of complementary coupling members configured to engage each other so as to form a physical connection. When the coupling members are removably interconnectable, the user may deconstruct previously built spatial structures and re-use the toy construction elements so as to build new spatial structures. For example, the toy construction elements may be interconnected/coupled to each other by traction/friction or by an interlocking connection.

In an embodiment, the toy construction system comprises two or more of the first type of toy construction elements. Hereby, the variation is further increased.

In an embodiment, each of the toy construction elements of the first type comprises at least one touch point, which is configured to be detected by the touch screen when engaging or brought into proximity of the touch screen.

In an embodiment, the first and the second type of toy construction elements are configured to be interconnected such that two or more touch points lie in a common plane of touch points. Hereby, all touch points in the common plane are able to be simultaneously detected by a touch screen.

In an embodiment, each of the one or more touch points is formed as a top surface of a protrusion protruding from an outer surface of the toy construction element of the first type. The protrusion may be constructionally different in shape and/or size from the coupling members, e.g. such that said protrusion cannot be connected to coupling members. Hereby, it is possible for the user to easily recognize the difference between touch points and coupling members and the associated functions.

In an embodiment, a touch point is defined by the top surface of a protrusion, and the toy construction elements are configured to be interconnected such that the touch points are the only elements of the spatial structure in said plane of touch points.

In an embodiment, each touch point comprises a smooth surface and rounded outer rim/edges. Hereby, the risk of damaging the touch screen is at least reduced.

In an embodiment, the one or more electrically conductive toy construction elements are made from a carbon fiber reinforced polymer. In an embodiment, the toy construction elements are injection molded.

In an embodiment, the at least one or more of the first type of toy construction element is electrically conductive. In some embodiments, at least a surface area of the construction element that defines the touch point is electrictly conductive so as to allow detection by a capacitive touch screen. In an embodiment, the first type of toy construction elements have a conductive surface area other than the touch point, said conductive surface area is conductively connected to the touch point by a conductive path. Hereby, the user may be able to activate the touch point by touching on the conductive surface area. The conductive area may cover a part or the whole external surface of the toy construction element.

In an embodiment, the construction elements are configured such that, when two or more toy construction elements of the first type are interconnected with each other—either directly or via other toy construction elements, such as toy construction elements of the second type—they are configured to define a touch point pattern, where said touch point pattern is determined by the dimensions of the toy construction elements of the toy construction system.

In an embodiment, the toy construction elements are configured to be interconnected such that all touch points are positioned on grid points of a regular grid. Hence, when constructing a spatial structure, the touch points will be arranged in a touch point pattern such that their relative positions and distances from each other follow a set of geometrical constraints, thereby reducing the risk of errors in recognizing different patterns. The regular grid may be a two-dimensional grid or a three-dimensional grid, e.g. a square grid, a cubic grid, a rectangular grid or the like.

In an embodiment, the touch point pattern is a variable touch point pattern. For example, the toy construction elements may be configured to form movable links between coupled toy construction elements, such as rotatable or sliding elements, enabling the touch points to be movable relative each other, thus creating a variable touch point pattern, e.g. a pattern having touch points with variable relative positions and/or distances from each other while following a set of geometrical constraints.

In an embodiment, the toy construction system may include an input component that can receive signals from a touch screen and generate an effect based on the signals, e.g. light, sound, movement. For example one or more of the toy construction elements, e.g. a toy construction element of the first type or a toy construction element of the second type, may comprise a sensor for receiving input from a touch screen, e.g. a light sensitive element.

In an embodiment, the toy construction system comprises an electronic device comprising a touch screen, and the electronic device comprises a processor configured to recognize a touch point pattern and to generate effects and responses on the touch screen based on a touch point pattern.

The present invention further relates to a method for providing input to an electronic device comprising a touch screen, comprising the steps of: providing a spatial structure comprising toy construction elements of at least one of the first type of toy construction elements adapted to provide a touch point pattern; positioning the structure on a touch screen within the detection area of the electronic device; registering the touch point pattern. The processor may further be configured to perform a function responsive to the detected touch point pattern, e.g. where respective functions are associated with different touch point patterns.

In an embodiment, the method comprises the further step of moving of the structure along the surface of the touch screen; recognizing the registered touch point pattern; registering the movement of the touch point pattern.

In an embodiment, the method comprises the further step of providing at least two structures for positioning on the touch screen, e.g. concurrently positioning on the touch screen.

BRIEF DESCRIPTION OF THE DRAWINGS

An embodiment of the invention will be described in the following with reference to the drawings wherein.

DETAILED DESCRIPTION OF THE INVENTION WITH REFERENCE TO THE FIGURES

The present invention relates to a toy construction system and a method for providing input to a touch screen. In some embodiments, the toy construction system comprises a first type of toy construction elements, which is configured to be detected by a touch screen, and a second type of toy construction elements, which is configured not to be detected by the touch screen.

Figure 1:
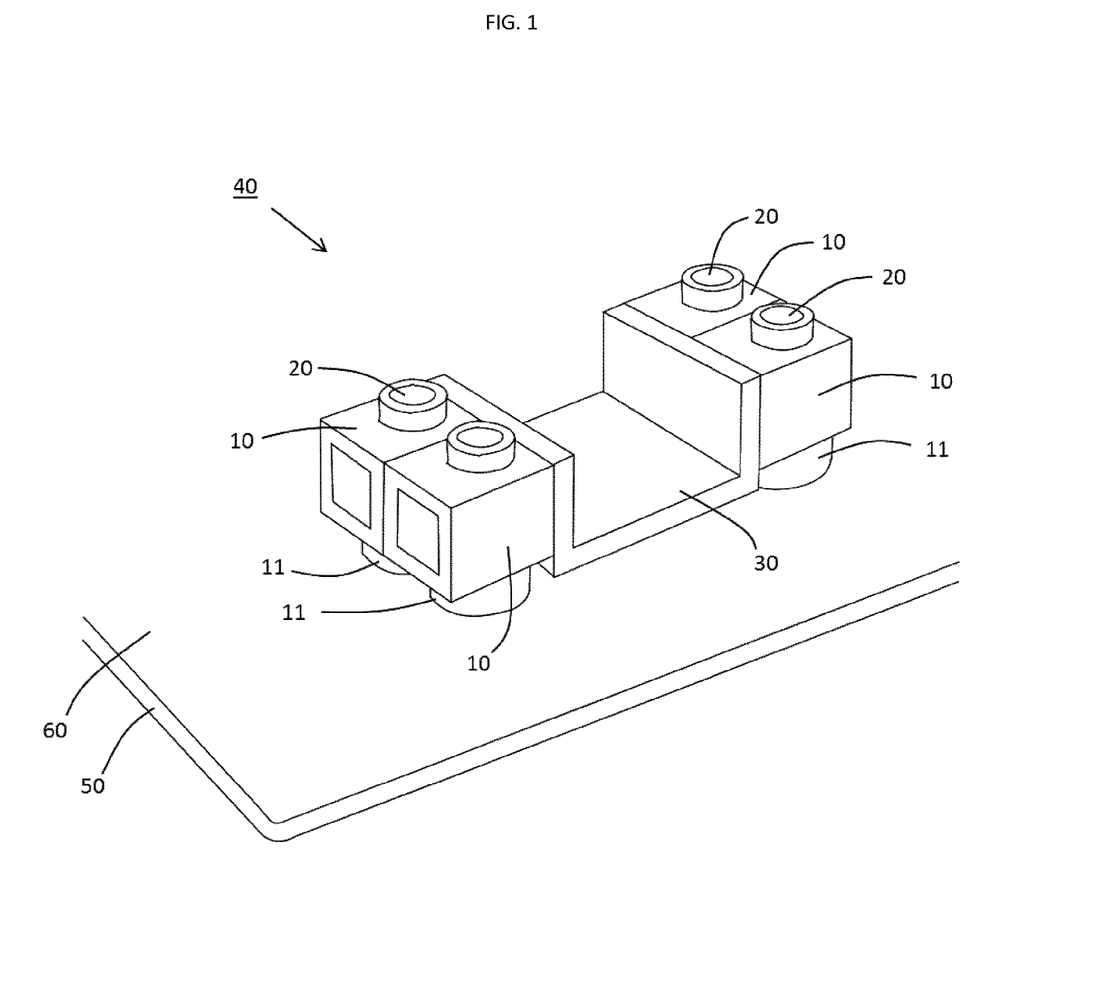
FIG. 1 is a perspective view of a structure comprising toy construction elements positioned on a touch screen.

FIG. 1 illustrates a spatial structure, generally designated 40, comprising toy construction elements, e.g. toy construction model or another structure formed by two or more interconnected toy construction elements. In the example of FIG. 1, the spatial structure comprises a plurality of toy construction elements directly or indirectly connected with each other by means of the coupling members. The toy construction elements are interconnectable so as to form a coherent structure.

The structure 40 comprises four toy construction elements of the first type 10 and one toy construction element of the second type 30. The first type of toy construction elements 10 are adapted to be detected by the touch screen 60, and thereby being able to be detected by the touch screen. It will be appreciated, however, that other examples of spatial structures may comprise a different number of construction elements including one, two, or more toy construction elements of the first type and none, one or more toy construction elements of the second type.

The first type of toy construction elements 10 comprises touch points 11 and coupling members 20, and the touch points 11 are configured to be registered by the touch screen 60, when the structure is positioned on the touch screen 60 of an electronic device 50.

The touch screen is an electronic visual display that the user can control through simple or multi-touch gestures by touching the screen. Touch screens are common in a variety of electronic devices such as game consoles, personal computers, tablet computers, and smartphones.

Generally the term touch screen is intended to comprise touch screens using different detection technologies such as an optical, e.g. laser-based, touch screen, a pressure sensitive screen, a touch-sensitive and/or touch screen, where proximity or contact of a finger or a pointing device, such as a stylus, is detectable by the electronic device 50 comprising the touch screen 60. The touch screen 60 may be a capacitive touch screen that reacts to a change in surface capacitance. Touching the touch screen 60 can be registered in different ways. Registration may be based on resistive technology, which require less pressure on the surface, but the registration can also be based on capacitive technology, in the form of a change in capacity, by either easy or without direct contact with the capacitive screen can be registered. The touch can be a physical touch or capacitive touch.

The first type of toy construction elements 10 that are configured to be registered by a touch screen may be electrically conductive. The toy constructive element may be partly or completely made from electrically conductive material to provide the capacitive touch on a touch screen, thus being detected by the touch screen. For example, the one or more electrically conductive toy construction elements may be made of carbon fiber reinforced polymer or from another suitable material. The conductive toy construction element may be constructed having an inner shell of non-conductive material covered with an outer shell made from a conductive material, or the conductive material may be positioned in bands across the surfaces of the toy construction elements, thus rendering the surface partly conductive. The first type of toy construction elements may have a conductive surface area other than the touch point, said conductive surface area being conductively connected to the touch point by a conductive path. In some embodiments, the electronic device may be operable to detect a touch point only when the corresponding construction element is touched or otherwise activated by a user, e.g. touched at a predetermined spot or surface area, or when the construction element is conductively connected to another toy construction element that is touched or otherwise activated be a user.

The electronic device 50 comprises a processing unit (such as a CPU) configured to register the spatial structure comprising toy construction elements having touch point in a pattern positioned on the touch screen and the registered touch pattern generate different corresponding effects.

Figures 2A, 2B, 2C:
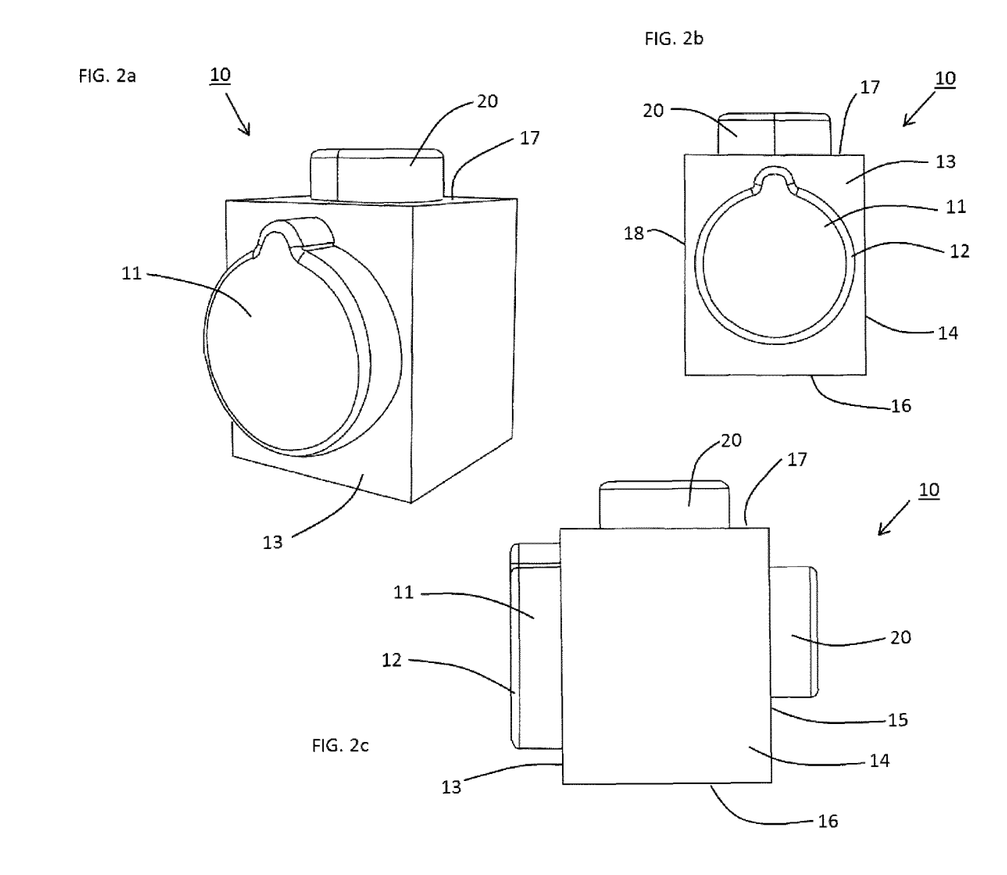
FIGS. 2a-2c are perspective views and two side views of a toy construction element.

FIG. 2 illustrates a generally box-shaped toy construction element of the first type of toy construction elements. There are three different views 2a, 2b and 2c of the first type of toy construction elements 10. The perspective view 2a shows the toy construction element 10 comprising coupling members 20 on element surface 17 and a touch point 11 on the element surface 13. The coupling members 20 and the touch point 11 are illustrated as protrusions having different shape, in order to recognize the different functions. For example, the coupling members 20 may be arranged to frictionally engage corresponding cavities of other toy construction elements.

The side view 2b shows the coupling members 20 on element surface 17, and the touch point 11 on element surface 13. The outer rim 12 of the touch point 11 is rounded. Element surfaces 14, 16, and 18 are flat without protrusions.

The side view 2c shows the touch point 11 with rounded outer rim 12 on element surface 13. The toy construction element 10 comprises two coupling members 20, respectively, on element surface 15 and element surface 17. The two element surfaces 14 and 16 do not have any protrusion. The shown toy construction element is box-shaped and has three element surfaces each comprising a respective protrusion in the form of a touch point 11 or a coupling member 20, respectively. In particular, the three element surfaces 13, 15 and 17 each comprise either members for coupling or means for being detected by a touch screen, and three element surfaces 14, 16 and 18 are without additionally functional means.

Generally, in some embodiments, a toy construction element may define a plurality of faces, e.g. a top face, a bottom face and a number of side faces. In some embodiments a given face may either include one or more touch points or one or more coupling members. In some embodiments, a face comprising a touch point does not also include a coupling member.

Figure 3:
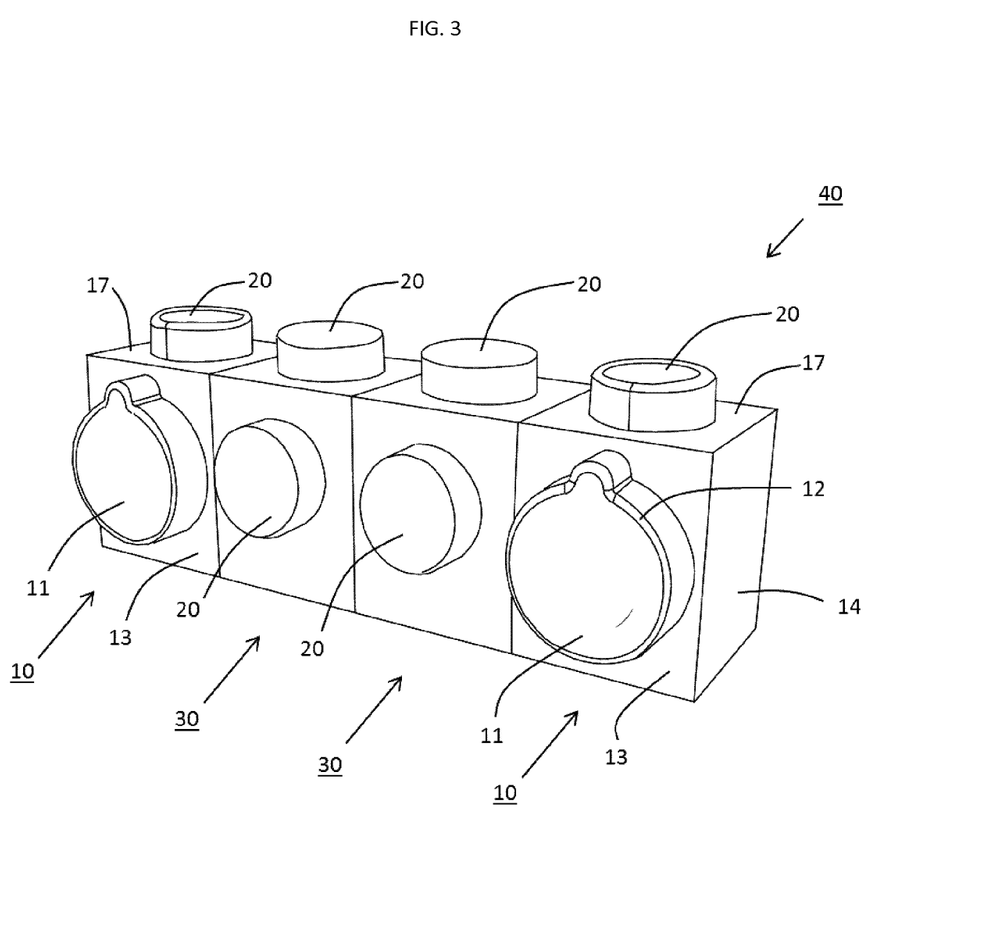
FIG. 3 is a perspective view of a structure comprising toy construction elements.

FIG. 3 illustrates an oblong spatial structure constructed from four interconnected toy construction elements 10, 30: two toy construction elements of the first type 10, and two toy construction elements of the second type 30. The second type of the toy construction elements 30 comprises coupling members 20, and the first type of toy construction elements 10 comprise coupling members on element surface 17 and a touch point 11 comprising a rounded outer rim 12 is positioned on element surface 13.

The toy construction elements 10, 30 are provided with a first and a second type of coupling members that are configured to be complementary to each other to the effect that they can be removably interconnected to form a spatial structure 40 comprising interconnected toy construction elements 10, 30. The two different types of coupling members may be in the form of coupling studs and complementary coupling members, such as a coupling stud and stud-receiving recesses.

In the example of FIG. 3, the first type of the toy construction elements 10 are positioned at each end of the oblong structure 40, and the distance between the two toy construction elements 10 is thus determined by the size of the first and of the second type of toy construction elements 10, 30.

The protrusions defining the touch point 11 and the coupling members 20 are different in shape, such that it is possible to recognize the two different purposes of the toy construction element 10.

The toy construction elements can be detachably interconnected by coupling members and thereby create a great variety of touch point patterns.

The patterns of the touch points are determined by the dimensions of the toy construction elements. Generally, in some embodiments, the toy construction elements of a toy construction set may be shaped and sized such that their dimensions and/or the distances between their respective coupling members are integer multiples of a unit length. The positions of the touch points may likewise be such that their relative distances from each other in a spatial structure are integer multiples of a unit length, e.g. the same unit length.

The toy construction system comprising the first type and the second type of toy construction elements allows the user to create a large set of distinct spatial structures, each identifiable by a corresponding touch point pattern. The user can construct objects with different touch point configurations.

In particular, the large number of individual structures with touch point patterns may be created from a relatively limited set of different toy construction elements including both the first and second type of toy construction elements. Combining a small set of toy construction elements in a toy construction system dramatically increases the total number of combinatorial possibilities by arranging the conductive bricks in different spatial configurations, and thus also touch point patterns.

In the FIGS. 1 and 3 the spatial structures comprise a plurality of toy construction elements directly or indirectly connected with each other by means of the coupling members of the toy construction system, e.g. in a predetermined spatial relationship with each other. The touch point patterns are determined by the dimensions of the elements of the toy construction system.

The toy construction system is a three dimensional system, wherein the user is able to create spatial structures in three dimensions. The touch points are positioned on grid points of a regular grid. For example at least a subset of the touch points of a spatial structure may be positioned on grid points of a two-dimensional regular grid, e.g. a square grid. A spatial structure may define one or more planes, e.g. parallel planes at regular intervals or otherwise regularly arranged planes, each plane defining a two-dimensional grid.

Figure 4:
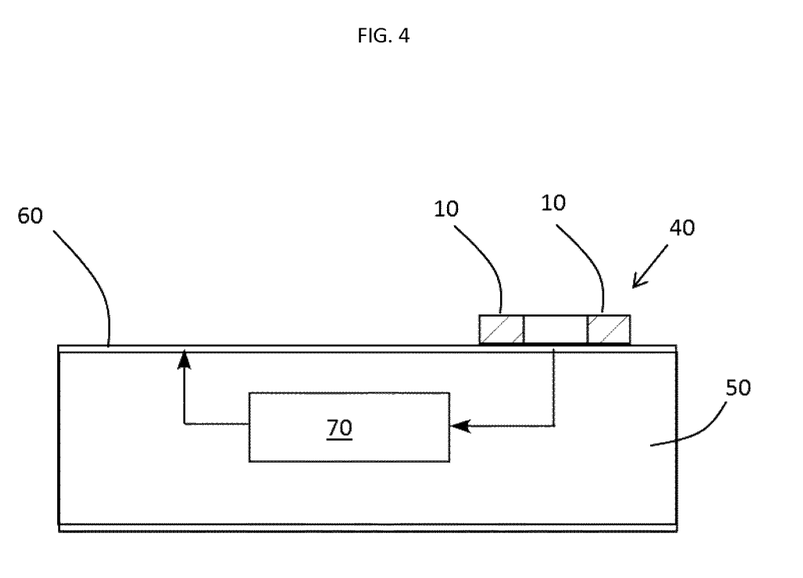
FIG. 4 is a schematic side view of an electronic device.

In FIG. 4 is illustrated an electronic device 50 comprising a touch screen 60 and a processor (CPU) 70. The processor 70 is configured to recognize one or more touch point patterns defined by a spatial structure, thus allowing the electronic device 50 to generate effects and responses on the touch screen 60 based on a touch point pattern provided by the toy construction system. Thus different configurations having different touch point patterns positioned on the touch screen 60 will be registered and generates corresponding effects and or responses. For example, the electronic device may have stored thereon a plurality of predetermined touch point patterns, each pattern associated with one or more instructions causing the electronic device to perform a respective function associated with the pattern. Examples of such functions may include the creation of visual effects on the touch screen, e.g. in a spatial association with the detected touch point pattern.

Generally, in some embodiments, when each touch point has a geometrical shape that is not rotationally symmetric, the electronic device may determine a location and orientation of individual touch points. In any event, the touch screen may recognize the location of one or more of the first type of elements as well as the relative position of the elements, if there are several first type elements on the touch screen. Hence, the electronic device may be configured to identify a touch point pattern and to determine the position and/or orientation of the pattern relative to the touch screen. The structure comprising one or more toy construction elements of the first type can interact with a virtual world and/or other game systems for playing games, and or other user-activated functions. This includes the concurrent use of one or more structures.

The toy construction system may include an input component that can receive signals from the touch screen and generate an effect based on the signals.

Movable links may be provided between coupled toy construction elements, such as rotatable or sliding elements, thereby allowing the touch points of a spatial structure to be movable relative to each other. This may enable the touch point pattern to be a variable touch point pattern, wherein the electronic device 50 comprises means for recognizing different spatial configurations of the variable touch point patterns and for generating corresponding effects and or responses. In some embodiments, the movement of the touch points of a variable touch point pattern relative to each other may be limited, e.g. such that the touch points may assume a predetermined set of discrete relative positions and/or be moved relative to each other within predetermined boundaries.

The touch points may be of different types. In addition to touch point patterns created by touch points of the toy construction elements, a touch point pattern may be created by a combination of touch points of the toy construction elements and other touch points. For example, a touch point pattern comprising three touch points may be created by two touch points of toy construction elements of the first type in combination with a finger/stylus.

The invention claimed is:

1. A toy construction system comprising:
an electronic device and toy construction elements, the toy construction elements comprising coupling members for detachably interconnecting the toy construction elements in at least two configurations to create a plurality of spatial structures the coupling members comprising coupling studs and stud-receiving recesses, the electronic device comprising a touch screen;
wherein the toy construction system comprises at least two of a first type of toy construction elements and at least one of a second type of toy construction element, each of the first type of toy construction elements being interconnectable with one or more other toy construction elements of the first type and at least one toy construction element of the second type;
wherein the second type of toy construction element is configured not to be detected by the touch screen;
wherein each of the at least two of a first type of toy construction element comprises a touch point, the touch points configured to be detected by a touch screen upon interaction therewith and to form, when the at least two of the first type of toy construction elements are interconnected with one or more of the first or second type of toy construction elements so as to form one of a plurality of spatial structures, a touch point pattern recognizable by the touch screen, the touch point pattern corresponding to the spatial structure;
wherein the electronic device comprises a processor configured to recognize the touch point pattern and to generate at least one or more effects or responses on the touch screen based on a recognized touch point pattern;
wherein the processor is configured to perform a function responsive to the recognized touch point pattern, where respective functions are associated with different touch point patterns; and
wherein the toy construction system is movable relative to the touch screen such that the processor is configured to recognize and register the movement of the touch point pattern.

2. The toy construction system according to claim 1, wherein the at least one or more of the first type of toy construction elements are electrically conductive.

3. The toy construction system according to claim 2, wherein the one or more electrically conductive toy construction elements are made from a carbon fiber reinforced polymer.

4. The toy construction system according to claim 1, wherein the toy construction elements are configured to be interconnected such that two or more of the touch points lie in a common plane of touch points.

5. The toy construction system according to claim 1, wherein each of the one or more touch points is formed as a top surface of a protrusion extending from an outer surface of a toy construction element of the first type, said protrusion being different in shape or size from the coupling members, such that said protrusion cannot be connected to coupling members.

6. The toy construction system according to claim 5, wherein the toy construction elements are configured to be interconnected so as to form a spatial structure such that the touch points are the only elements of the spatial structure in said plane of touch points.

7. The toy construction system according to claim 1, wherein each touch point is formed as a top surface of a protrusion extending for an outer surface of a toy construction element of the first type and comprises a smooth surface and rounded outer rim/edges.

8. The toy construction system according to claim 1, wherein each of the first type of toy construction elements has a conductive surface area other than the touch point, said conductive surface area is conductively connected to the touch point by a conductive path.

9. The toy construction system according to claim 1, wherein the toy construction elements are configured to be interconnected to form a spatial structure such that all the touch points of the spatial structure are positioned on grid points of a regular grid.

10. The toy construction system according to claim 1 wherein the touch point pattern is a variable touch point pattern.

11. The toy construction system according to claim 1, wherein the toy construction elements are injection molded.

12. The toy construction system according to claim 1, wherein the toy construction system includes an input component that can receive signals from a touch screen and generate an effect based on the signals, the effect including one or more of light, sound, and movement.

* * * * *